(12) United States Patent
Clarke

(10) Patent No.: US 12,342,445 B2
(45) Date of Patent: *Jun. 24, 2025

(54) ENERGY TRANSFER METHOD AND SYSTEM

(71) Applicant: Hydrogen Universe Ltd, Edinburgh (GB)

(72) Inventor: Tanya Clarke, Edinburgh (GB)

(73) Assignee: HYDROGEN UNIVERSE LTD, Edinburgh (GB)

( * ) Notice: Subject to any disclaimer, the term of this patent is extended or adjusted under 35 U.S.C. 154(b) by 114 days.

This patent is subject to a terminal disclaimer.

(21) Appl. No.: 18/115,053

(22) Filed: Feb. 28, 2023

(65) Prior Publication Data

US 2023/0209668 A1    Jun. 29, 2023

Related U.S. Application Data

(63) Continuation of application No. 16/323,513, filed as application No. PCT/GB2017/052183 on Jul. 26, 2017, now Pat. No. 11,622,425.

(30) Foreign Application Priority Data

Aug. 5, 2016 (GB) .................................. 1613491

(51) Int. Cl.
*H05H 7/08* (2006.01)
*C25B 1/04* (2021.01)
(Continued)

(52) U.S. Cl.
CPC ................. *H05B 7/08* (2013.01); *C25B 1/04* (2013.01); *H01M 8/0267* (2013.01); *H05B 6/00* (2013.01); *H05H 1/50* (2013.01); *Y02E 60/32* (2013.01)

(58) Field of Classification Search
CPC ... H05B 7/08; C25B 1/04; C25B 6/00; H01M 8/0267; H05H 1/50; H05H 1/02;
(Continued)

(56) References Cited

U.S. PATENT DOCUMENTS 3,029,635 A    4/1962  Fetz
3,215,869 A    11/1965 Hatsopoulos et al.
(Continued)

FOREIGN PATENT DOCUMENTS

DE    10043390    3/2002
EP    1681465     7/2006
(Continued)

OTHER PUBLICATIONS

International Preliminary Report on Patentability dated Feb. 5, 2019 issued in corresponding International Application No. PCT/GB2017/052183.

(Continued)

*Primary Examiner* — Xiuyu Tai
(74) *Attorney, Agent, or Firm* — Onello & Mello, LLP

(57) ABSTRACT

A system (10) and method for transferring energy utilises an evacuated recirculation duct (11), with a pump (20) to circulate gas and a control nozzle (22) to form a jet of gas. Hydrogen gas is provided into the duct to be circulated, and an electrical device (30, 32) provides energy into the jet of gas so as to form hydrogen atoms. A heat exchanger (44) is arranged downstream of the electrical device (30, 32), onto which the flowing jet of gas impacts. Means (40) are also provided to generate an electric or magnetic field in the region of the jet of gas between the electrical device (30, 32) and the heat exchanger (44), and is connected to a source (42) of electricity. For example, an electromagnet coil (40) and may generate a magnetic field (B) transverse to the direction of travel of the jet of gas, or an electromagnet coil (Continued)

(40A, 40B) may generate a magnetic field parallel to the jet of gas.

15 Claims, 3 Drawing Sheets

(51) Int. Cl.
*H01M 8/0267* (2016.01)
*H05B 6/00* (2006.01)
*H05B 7/08* (2006.01)
*H05H 1/50* (2006.01)

(58) Field of Classification Search
CPC .. H05H 1/03; H05H 1/26; H05H 1/28; H05H 1/30; H05H 1/32; H05H 1/52; Y02E 60/32; H01J 37/3244; H01J 37/32596; H01J 37/3233; H01J 2237/3321; C23C 16/50

See application file for complete search history.

(56) References Cited

U.S. PATENT DOCUMENTS

| | | |
|---|---|---|
| 3,324,027 A | 6/1967 | Berghaus |
| 3,585,434 A | 6/1971 | Kato et al. |
| 3,736,453 A | 5/1973 | Miller et al. |
| 4,077,788 A | 3/1978 | Woollam |
| 5,684,218 A | 11/1997 | Webster |
| 6,972,118 B2 | 12/2005 | Santilli |
| 7,541,604 B2 | 6/2009 | Goetze et al. |
| 2003/0113597 A1 | 6/2003 | Santilli |
| 2004/0247522 A1* | 12/2004 | Mills ................. C23C 16/27 423/648.1 |
| 2007/0114946 A1 | 5/2007 | Goetze et al. |
| 2015/0318151 A1* | 11/2015 | Krassnitzer ............. H05H 1/50 315/111.21 |

FOREIGN PATENT DOCUMENTS

| | | |
|---|---|---|
| JP | 56075573 | 6/1981 |
| WO | 2007098368 | 8/2007 |
| WO | 2015173561 | 11/2015 |

OTHER PUBLICATIONS

International Search Report and Written Opinion dated Oct. 25, 2017 issued in corresponding International Application No. PCT/GB2017/052183.

Great Britain Office Action dated Jan. 27, 2017 issued in corresponding Great Britain Application No. 1613491.8.

* cited by examiner

ENERGY TRANSFER METHOD AND SYSTEM

CROSS REFERENCE TO RELATED APPLICATIONS

The present application is a continuation of U.S. patent application Ser. No. 16/323,513, filed Feb. 5, 2019, which is a 371 national stage application of Patent Cooperation Treaty Application No. PCT/GB2017/052183 filed Jul. 26, 2017, which in turn claims priority under 35 USC 119(e) to British Patent Application No. 1613491.8, filed Aug. 5, 2016.

FIELD OF INTEREST

The present invention relates to a method of transferring energy, and to a system for performing the method. In particular, it provides a way of providing heat energy. It may be applied in various different settings, and may be applicable on an industrial scale.

SUMMARY

According to the present invention there is provided a system for transferring energy, the system comprising an evacuated recirculation duct, with a pump to circulate gas around the recirculation duct and a control nozzle to form a jet of gas; means to provide hydrogen gas into the duct; an electrical device to provide energy into the jet of gas so as to form hydrogen atoms; a heat exchanger within the recirculation duct downstream of the electrical device, onto which the flowing jet of gas impacts; and means to subject the region of the jet of gas between the electrical device and the heat exchanger to a magnetic or electric field.

The electrical device to form hydrogen atoms may for example consist of a pair of opposed spaced-apart tungsten electrodes between which electrical DC or AC voltage is applied, so as to produce an electrical arc, arranged such that the hydrogen gas flows through the gap between the electrodes, the direction of gas flow emerging from the gap being substantially orthogonal to the direction of the electrical arc. An alternative electrical device consists of a tungsten wire, which when electrically heated can cause dissociation of hydrogen molecules into hydrogen atoms.

In operation, a charge of hydrogen is initially introduced; and that hydrogen is then recirculated. Subsequently, additional hydrogen is provided to replace the losses of hydrogen from the system, for example due to implantation into the heat exchanger, or through other processes. The operation of the pump, in combination with the restriction from the nozzle is such as to ensure that the region of the recirculation duct between the nozzle and the heat exchanger is at a reduced pressure, preferably less than 50 kPa, more preferably less than 20 kPa, for example 10 kPa or 5 kPa or even 1 kPa. In one embodiment the reduced pressure is 10 kPa.

The magnetic or electric fields are created using a source of electricity. The magnetic field-generating means may comprise an electromagnet coil connected to that source. In operation, the intensity of the magnetic field may be varied by adjusting the current flowing through the electromagnetic coil, as this modifies the positions at which any ions within the flowing jet of gas impact with the heat exchanger. If the field is transverse to the direction of travel of the jet it will deflect the ions; while if the field is generally parallel to the direction of the jet it will cause any ions that diverge from the jet to follow a spiral path. This consequently spreads out the heat load on the heat exchanger.

The electric field-generating means may comprise two electrodes, each defining an aperture through which the jet of gas can flow. For example, one electrode may be an annular plate electrode, and the other electrode may be a tubular electrode.

In a further modification the heat exchanger may be integral with a fuel cell; in this case the heat exchanger itself may form part of the wall of the recirculation duct.

It is surmised that during operation hydrogen molecules are converted to hydrogen atoms, and atoms of hydrogen are ionised to protons and electrons. The latter are the fuel that is believed to provide the heat when the jet bombards the heat exchanger, and that subsequently become part of water molecules at the outflow from the fuel cell.

In a second aspect the invention provides a method for transferring energy using such a system.

It will be appreciated that the means to provide hydrogen gas may be an electrolysis cell for electrolysis of water. Such an electrolysis cell may for example use solar power to provide the electric power for the electrolysis.

BRIEF DESCRIPTION OF THE DRAWINGS

The invention will now be further and more particularly described, by way of example only, and with reference to the accompanying drawings, in which.

DETAILED DESCRIPTION OF PREFERRED EMBODIMENTS

Figure 1:
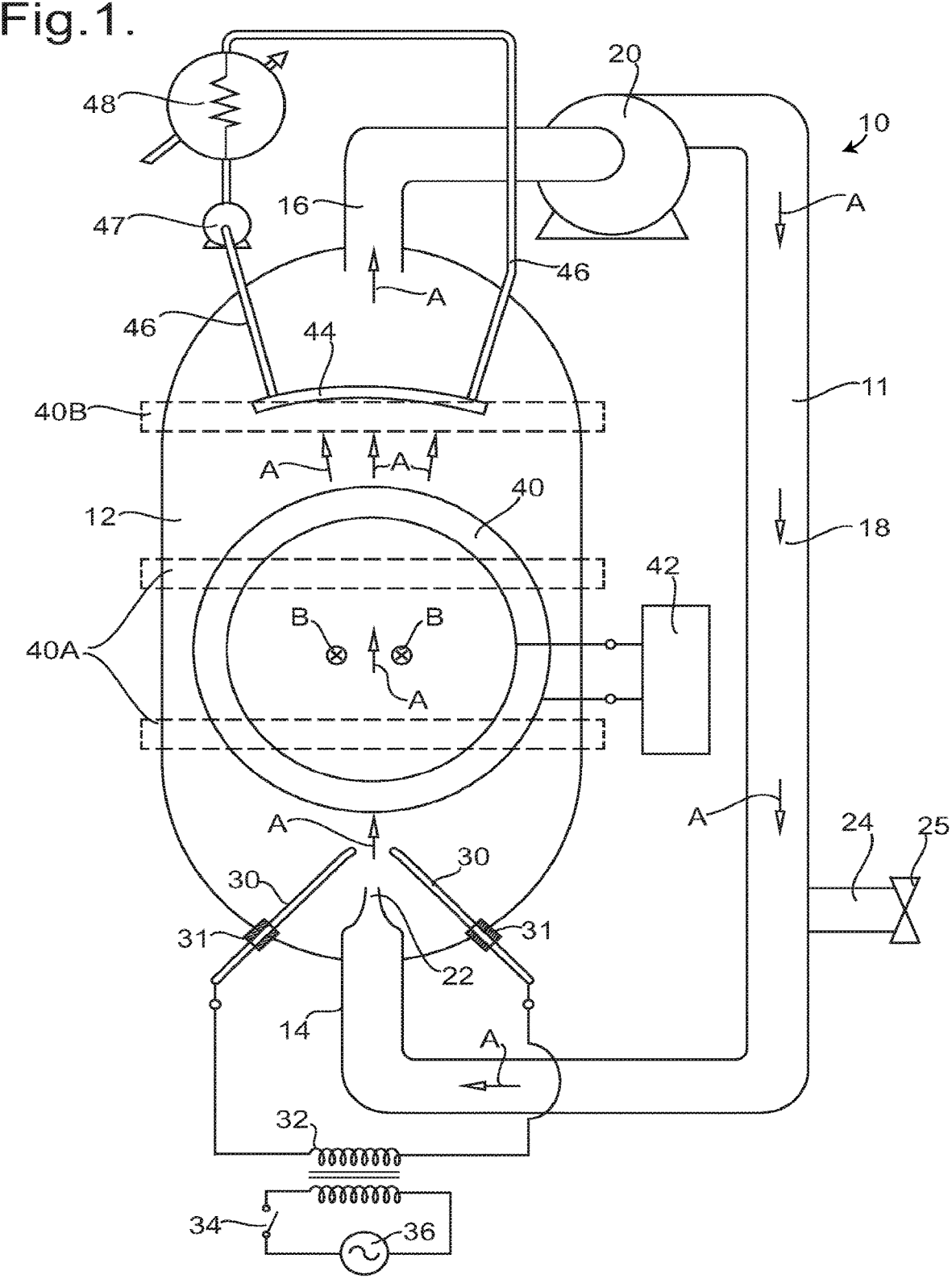
FIG. 1 shows a flow diagram of a system of the invention, the view corresponding to a side view.

Referring to FIG. 1, an energy transfer system 10 includes a recirculation duct 11 consisting of a process chamber 12 with an inlet pipe 14 at one end, and an outlet pipe 16 at the opposite end, the inlet pipe 14 and the outlet pipe 16 being interconnected by a pipe 18 and a pump 20. The inlet pipe 14 defines a nozzle 22 where it opens into the process chamber 12; and a branch pipe 24 with a valve 25 enables gas to be extracted from or introduced into the recirculation duct 11. The recirculation duct 11 thus defines a closed loop, around which a gas can be circulated by the pump 20. The flow of the gas is indicated by arrows A.

Two rod-shaped tungsten electrodes 30 project through seals 31 in the wall of the process chamber 12 so that the tips of the electrodes 30 are opposite each other a short distance from the end of the nozzle 22, so when a gas jet emerges from the nozzle 22 the tips of the electrodes 30 are on opposite sides of the gas jet. The electrodes 30 are inclined at about 45° to the axis of the nozzle 22 and so of the resulting gas jet. The seals 31 allow the electrodes 30 to be slid in or out, to adjust the separation between the opposed tips. The tungsten electrodes 30 may for example be of diameter between 3 mm and 5 mm, by way of example. The electrodes are connected to an external electrical circuit (represented schematically) including a load transformer 32 with a secondary coil and a primary coil, the electrodes 30 being connected to opposite ends of the secondary coil of the load transformer 32, and the primary coil of the load transformer 32 being connected through a switch 34 to an AC power supply 36.

Two co-axial electromagnet coils 40 (only one is shown) are arranged so as to create a magnetic field B that is in a direction orthogonal to the flow path of the gas through the process chamber 12, for at least the major part of that path. As indicated by circles with crosses, the magnetic field B in the vicinity of the axis of the coils 40 may be in the direction into the paper, that is to say away from the observer. The two coils 40 may both be within the process chamber 12, spaced apart so the gas flows between them, but preferably the two coils are outside the wall of the process chamber 12, opposite each other. The two coils 40 are connected to a current source 42, which provides a varying current. This may vary only in magnitude, or alternatively it may vary in both magnitude and direction, and the magnetic field B will therefore also vary either in magnitude, or in both magnitude and direction; however, it is always orthogonal to the flow path of the gas. The coils 40 may be provided with a core of magnetic material, or may be air-cored. By way of example, the electric current provided by the current source 42 is a frequency less than 100 Hz, for example a 50 Hz AC current, so that the magnetic field is alternately applied in opposite directions.

Towards the other end of the process chamber 12 is a curved heat exchange target 44 which defines flow paths within it for a coolant, the heat exchange target 44 being connected by coolant flow ducts 46 to a pump 47 and an external heat exchanger 48 that are outside the process chamber 12.

In operation some hydrogen gas is introduced into the recirculation duct 11, and is circulated by the pump 20. The quantity of hydrogen, the operation of the pump 20 and the restriction from the nozzle 22 are such that the pressure within the process chamber 12 is 10 kPa. During operation additional hydrogen is provided to replace the losses of hydrogen from the system.

A coolant fluid which may for example be a liquid such as water or a gas such as nitrogen is pumped by the pump 47 through the heat exchange target 44; during operation the heat exchange target 44 becomes hot, and the coolant fluid removes this heat. The heat may be utilised directly (for example by providing superheated water to a steam turbine connected to a generator), but in FIG. 1 the heat is transferred in two stages, first being transferred to the coolant fluid that flows through the heat exchange target 44, and then being transferred to a secondary coolant fluid that is caused to flow through the external heat exchanger 48. The secondary coolant fluid may be used directly to provide heat, for example to heat a domestic property or a greenhouse, or may be used to generate electricity. Ideally the removed heat is used to supply combined heat and power in order to maximise the useful output.

The switch 34 is activated to provide electrical voltage between the tips of the electrodes 30, and thereby to strike an arc in the low-pressure hydrogen between the tips of the electrodes 30. The voltage applied between the electrodes 30 may be greater than 50 V, for example 100 V, 150 V or 200 V or even higher. It may be necessary to bring the tips of the electrodes 30 slightly closer together, to initiate the arc, and then to move them further apart. The separation between the tips of the electrodes 30, during normal operation, may for example be between 1 mm and 5 mm, for example 3 mm.

The electrical power input into the system 10 is primarily the electrical power provided to the electrodes 30 by the AC power supply 36. This clearly depends upon the electric current that flows in the arc, as well as the voltage. It will be appreciated that this arrangement has some similarity to the hydrogen arc welding device developed by Langmuir in about 1911, which was found capable of welding materials including tungsten; but in the present case the process is carried out at reduced pressure and in the presence only of hydrogen gas. The energy needed to bring about the dissociation of hydrogen molecules into atoms is about 420 kJ/mole, so that is the amount of energy conventionally expected to be given out as heat if the atoms recombine, whether in the gas stream or on impact with the surface of the target 44. However, in this case it is surmised that there is considerably more thermal energy available from the gas jet.

The energy put into the hydrogen gas as it passes through the arc causes dissociation of hydrogen molecules into hydrogen atoms. The degree of dissociation will depend upon the temperature of the arc, and the electrical power provided into the arc. It can be expected that hydrogen molecules will be provided with a range of different energies by the arc, and at least some hydrogen atoms will become ionised. Consequently, the gas jet flowing through the process chamber 12 includes hydrogen molecules, hydrogen atoms, and ions, that is to say electrons and protons, predominantly protons. The electrons and protons are envisaged as being the primary source of energy.

The magnetic field B from the coils 40 will tend to cause any ions to follow a curved path, and the variation of the magnetic field B therefore tends to vary the exact position at which the gas jet impacts on the curved heat exchange target 44. As mentioned above, such a gas jet can bring about very high temperatures, sufficient to melt tungsten, so the material of the heat exchange target 44 and the flow rate of coolant through it must be sufficient to remove the heat in such a way as to prevent damage to the surface of the heat exchange target 44. The effect of the varying magnetic field B is to slightly spread out the heat load over the surface of the heat exchange target 44.

It will be appreciated that the above description is by way of example only, and that the system may be modified in various ways while remaining within the scope of the invention, which is defined by the claims. For example, instead of a single nozzle 22 aiming at the gap between the electrodes 30, the gas might instead be fed through two nozzles, one alongside each electrode 30, so that the gas streams meet at the gap and flow out as indicated by the arrow A as shown. Instead of the coils 40 creating a field transverse to the jet, there might be one or more electromagnet coils 40A, 40B (shown in broken lines) whose axis is coaxial with the centreline of the jet; any ions that diverge from the jet will therefore be caused to follow a spiral path around the axis. If one such coil 40B is at approximately the same position along the process chamber 12 as the heat exchange target 44, this provides a somewhat greater magnetic field intensity in the axial direction at the heat exchange target 44, which tends to focus the ions onto the heat exchange target 44.

It has been surmised, for example by Dr. Ivan A. Strilets (*Journal of Modern Physics*, 2014, 5, 1302-1320: http://www.scirp.org/journal/Paperinformation.aspx?paperID=49252) that hydrogen atoms may be unstable, and spontaneously ionise. If that is the case, then at least some (and possibly the majority) of the hydrogen atoms produced in the arc may ionise before they reach the heat exchange target 44. This article also suggests that the resulting electrons would have significant kinetic energy, about 1300 kJ/mole. It has been surmised that at least the electrons may thereby provide additional energy. Energy may also be obtained from the protons that bombard the target 44. Consequently, it has been suggested that the amount of thermal energy available from the target 44 may be considerably greater than the electrical energy provided by the power supply 36.

Figure 2:
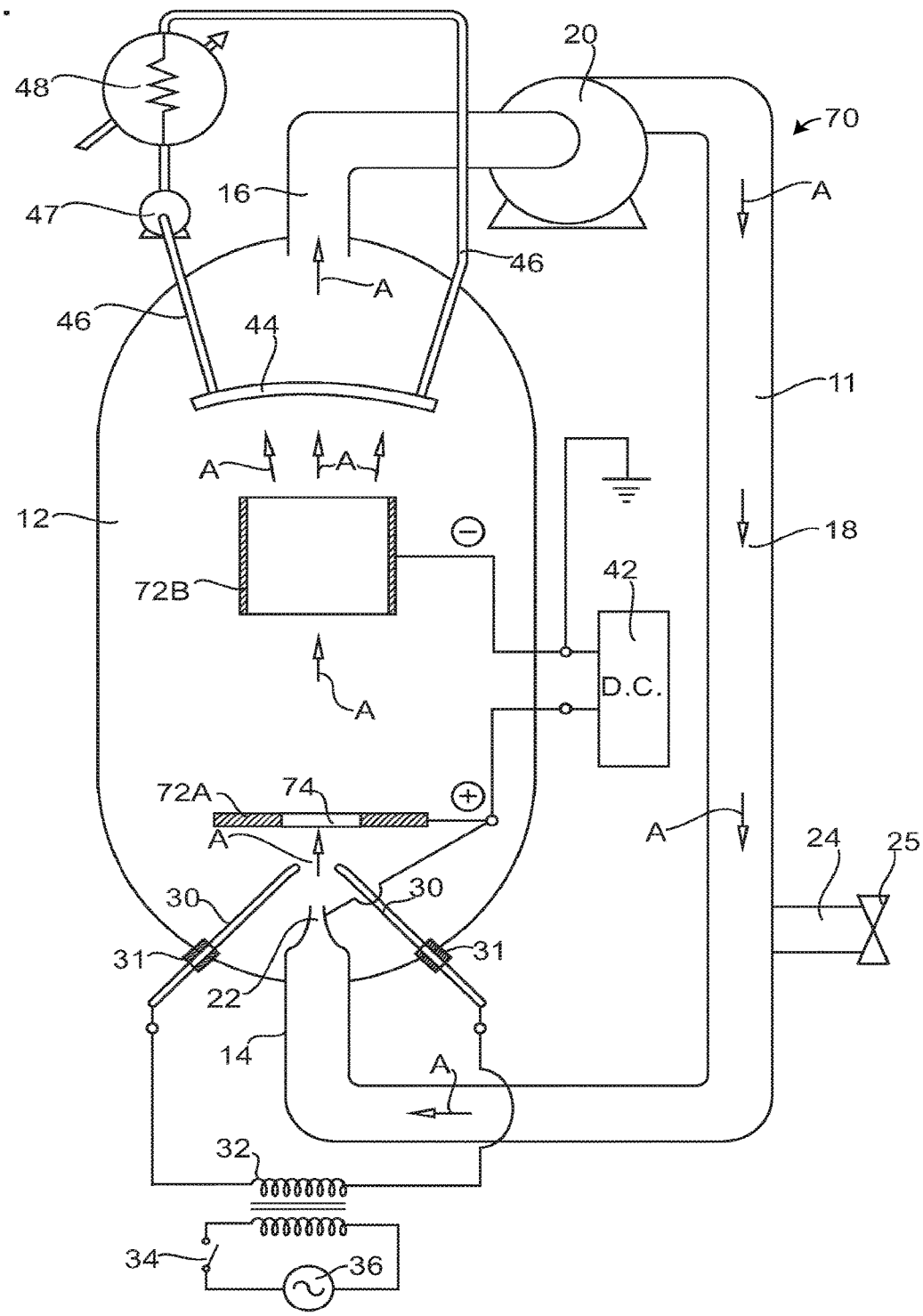
FIG. 2 shows a flow diagram of a modification to the system shown in FIG. 1.

Referring now to FIG. 2 there is shown a system 70 which is a modification to the system 10 of FIG. 1, in which an external voltage is provided between the heat exchange target 44, or an electrode in the vicinity of the heat exchange target 44 (as cathode), and an electrode (as anode) in the vicinity of the electrodes 30; this will vary the kinetic energy of the ions that impact onto the heat exchange target 44. This may for example be a voltage between 500 V and 10 kV. This may be in addition to, or instead of, the electromagnet coils 40; in the system 70 as shown, the electromagnet coils 40 are not provided.

More specifically, as shown in the FIG. 2, an annular plate electrode 72A above the electrodes 30, and a tubular electrode 72B are arranged so as to create an electric field generally parallel to the flow path of the gas through the process chamber 12, for at least the major part of that path. The annular plate electrode 72A and the tubular electrode 72B are connected to the positive and negative terminals of a high-voltage DC source 42. This may vary in magnitude, but is preferably a fixed voltage. The positive terminal is also electrically connected to the nozzle 22; while the negative terminal is connected to earth. The gas jet passes through the aperture 74 in the annular plate electrode 72A and then passes through the bore of the tubular electrode 72B, and while it is travelling between the electrodes 72A and 72B the gas jet is therefore subjected to the electric field acting in the same direction as the direction of travel of the jet. Consequently, any positive ions in the gas jet are accelerated in that direction, whereas any negative ions (or electrons) are decelerated.

In other respects the system 70 is the same as the system 10 of FIG. 1, and operates in substantially the same way.

Figure 3:
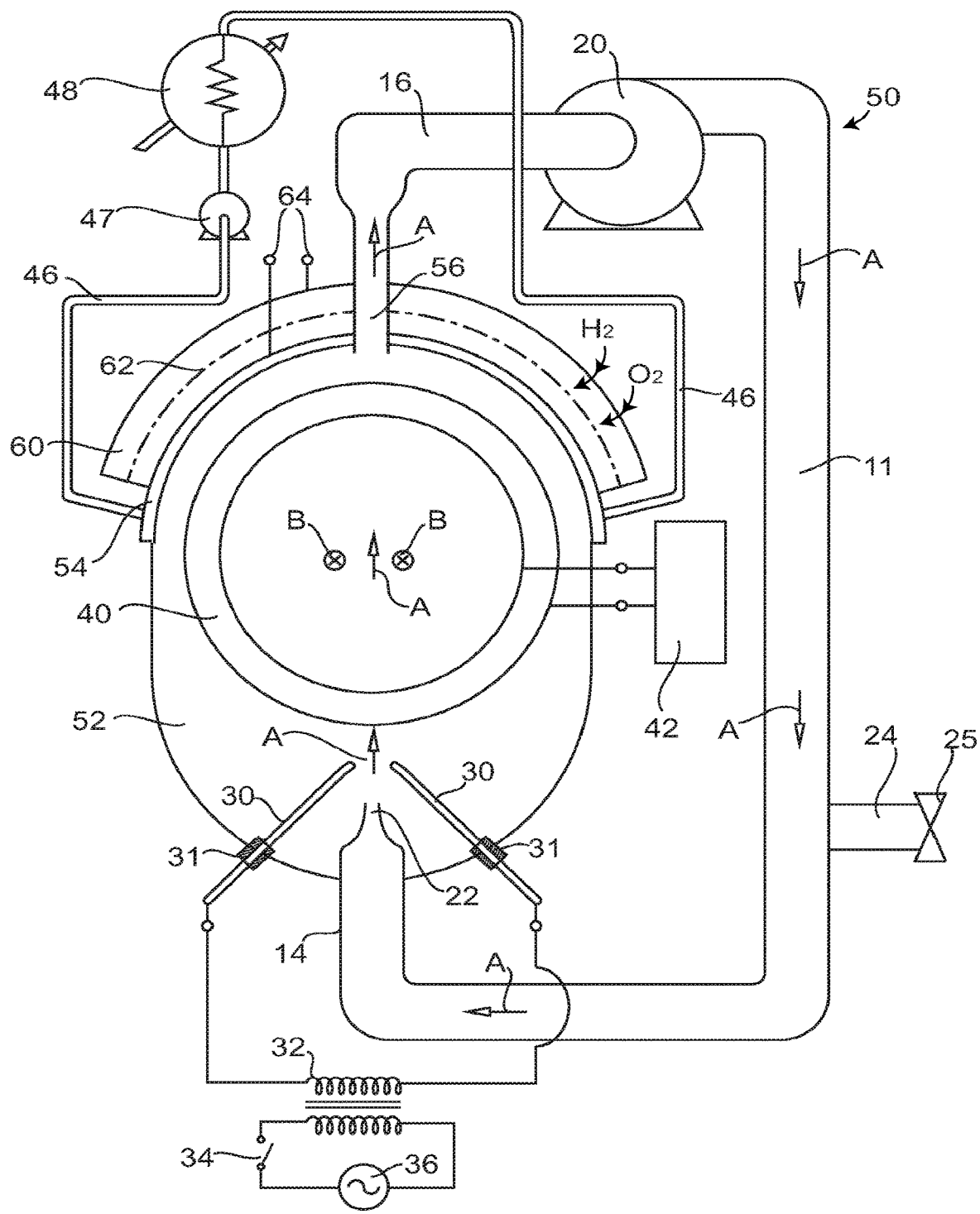
FIG. 3 shows a flow diagram of an alternative modification to the system shown in FIG. 1.

Referring now to FIG. 3 there is shown an energy transfer system 50 which is an alternative modification to the system 10 of FIG. 1, identical components being referred to by the same reference numerals. In most respects the system 50 is the same as the system 10, but has a process chamber 52 that is shorter, and a semicircular end wall of the process chamber 52 includes fluid flow paths so it can act as a heat exchanger target 54. The heat exchange target 54 is connected by coolant flow ducts 46 to a pump 47 and an external heat exchanger 48 that are outside the process chamber 52. The outlet duct 16 communicates through a narrower outlet duct 56 with the end of the process chamber 52, the narrow outlet duct 56 extending through the heat exchanger target 54 and the fuel cell 60, to carry any remaining hydrogen molecules out of the process chamber 52.

The outer surface of the heat exchange target 54 is immediately adjacent to a fuel cell 60 with two electrode chambers separated by an electrolyte 62 (indicated by a chain broken line); the electrode chamber adjacent to the outer surface of the heat exchange target 54 is a cathode chamber to which air is supplied (as indicated by 02), while hydrogen gas (as indicated by H2) is supplied to the other electrode chamber. In this example the electrolyte 62 is assumed to be a conductor of hydroxyl ions, so the reactions are as follows, at the anode:

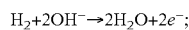

and at the cathode:

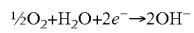

so that the overall reaction is hydrogen plus oxygen giving water, but with simultaneous generation of electricity, and with diffusion of hydroxyl ions from the cathode to the anode through the electrolyte. Consequently, there is a voltage developed between terminals 64 connected to the respective electrodes. As this is a fuel cell, it will be appreciated that the anode is the negative electrode (at which oxidation takes place) and the cathode is the positive electrode (at which reduction takes place).

Operation of the heat transfer system 50 is substantially the same as described above, as hydrogen gas is introduced into the recirculation duct 11, and is circulated by the pump 20. The quantity of hydrogen, the operation of the pump 20 and the restriction from the nozzle 22 are such that the pressure within the process chamber 52 is 10 kPa. A coolant fluid is pumped by the pump 47 through the heat exchange target 54 to remove heat arising when the hydrogen jet impacts with the heat exchange target 54. The switch 34 is activated to provide electrical voltage between the tips of the electrodes 30, and thereby to strike an arc in the low-pressure hydrogen between the tips of the electrodes 30, so the gas jet flowing through the process chamber 52 includes hydrogen molecules, hydrogen atoms, and ions, that is to say electrons and protons.

The magnetic field B from the coils 40 will tend to cause any ions to follow a curved path, and the variation of the magnetic field B therefore tends to vary the exact position at which the ions in the jet impact on the curved heat exchange target 54.

Heat is generated as a result of any hydrogen atoms recombining when they hit the heat exchange target 54, and also as a result of energy transfer when protons and electrons impact with the heat exchange target 54. Any protons that become embedded in the material of the heat exchange target 54 will tend to diffuse through the heat exchange target 54, and so reach the vicinity of the cathode, where they can interact with oxygen to form water.

As commented previously in relation to the system 10, the system 50 is described by way of example only, and so the system may be modified in various ways while remaining within the scope of the invention, which is defined by the claims. For example, instead of a single nozzle 22 aiming at the gap between the electrodes 30, the gas might instead be fed through two nozzles, one alongside each electrode 30, so that the gas streams meet at the gap and flow out as indicated by the arrow A as shown. Instead of the coils 40 creating a field transverse to the jet, there might be one or more electromagnet coils 40A, 40B whose axis is coaxial with the centreline of the jet, as shown as an option in FIG. 1; any ions that diverge from the jet will therefore be caused to follow a spiral path around the axis.

In another modification, a varying external voltage may be provided between an electrode (a cathode) in the vicinity of the heat exchange target 54 and an electrode (as anode) in the vicinity of the electrodes 30; this will vary the kinetic energy of the ions that impact onto the heat exchange target 54. This may for example be a voltage between 500 V and 10 kV. These electrodes may for example be the equivalent of the electrodes 72B and 72A of the system 70. This may be in addition to, or instead of, the electromagnet coils 40 or 40A.

As another alternative the fuel cell might be one in which the electrolyte conducts protons rather than hydroxyl ions, in which case the details of the chemical reactions at the electrodes would be somewhat different. More generally it will be appreciated that features shown or described in relation to the system 10 may be used in the system 50, and vice versa.

As indicated above, it is believed that hydrogen atoms generated by the arc will spontaneously ionise; and that the resulting electrons and protons will provide thermal energy when they hit the heat exchanger 44 or 54. Not only is it believed that the kinetic energy of the electrons provides a significant amount of thermal energy, in excess of the energy input to achieve dissociation, but it is also believed that significantly more thermal energy is provided by the impact of the protons. It has been estimated that if 0.34 g of hydrogen are used up per second in this manner, the resulting power would be 2500 MW.

The fuel cell 60 produces very little electrical power in comparison to the thermal power generated as explained above; nevertheless, the fuel cell 60 serves the beneficial purpose of safely disposing of protons and electrons generated during operation.

What is claimed is:

1. A system for transferring energy, the system comprising a hydrogen gas source to provide hydrogen gas into a recirculation duct, wherein the recirculation duct comprises a pump to circulate the hydrogen gas around the recirculation duct and a control nozzle to form a jet of the hydrogen gas; an electrical device to provide energy into the jet of hydrogen gas so as to form hydrogen atoms; a heat exchanger within the recirculation duct downstream of the electrical device, onto which the flowing jet of hydrogen gas impacts; and an electromagnetic field source to subject the region of the jet of hydrogen gas between the electrical device and the heat exchanger to a magnetic or electric field, wherein the electrical device to form the hydrogen atoms includes a tungsten electrode and a power supply to electrically heat the tungsten electrode.

2. The system as claimed in claim 1 wherein the electromagnetic field source is an electromagnetic coil arranged to provide the magnetic field.

3. The system as claimed in claim 2 wherein the magnetic field is substantially parallel to the direction of the jet of hydrogen gas.

4. The system as claimed in claim 1 wherein the electromagnetic field source is configured to produce the electric field in a direction substantially parallel to the centre line of the jet of hydrogen gas.

5. The system as claimed in claim 4 wherein the electromagnetic field source comprises two electrodes, each defining an aperture through which the jet of hydrogen gas can flow.

6. The system as claimed in claim 5 wherein one electrode is an annular plate electrode, and the other electrode is a tubular electrode.

7. The system as claimed in claim 1 wherein the heat exchanger is immediately adjacent to a fuel cell.

8. The system as claimed in claim 7 wherein the heat exchanger forms part of a wall of the recirculation duct.

9. The method for transferring energy using the system as claimed in claim 1, comprising:
providing the hydrogen gas into the recirculation duct from the hydrogen gas source;
circulating the hydrogen gas around the recirculation duct using the pump;
forming the jet of hydrogen gas using the control nozzle;
providing energy from the electrical device into the jet of hydrogen gas so as to form the hydrogen atoms, wherein the electrical device to form the hydrogen atoms consists of the tungsten electrode and the power supply to electrically heat the tungsten electrode;
using the electromagnetic field source to subject the region of the jet of hydrogen gas between the electrical device and the heat exchanger to the magnetic or electric field; and
transferring the energy from the jet of hydrogen gas impacting onto the heat exchanger to outside of the recirculation duct via the heat exchanger, for utilization outside of the recirculation duct.

10. The method as claimed in claim 9 wherein the quantity of hydrogen, the operation of the pump, and the restriction from the control nozzle are selected such as to ensure that the region of the recirculation duct between the control nozzle and the heat exchanger is at a reduced pressure, less than 20 kPa.

11. The method as claimed in claim 9 wherein the electromagnetic field source is an electromagnetic coil arranged to provide the magnetic field, and current through the electromagnetic coil is adjusted and varied so as to vary the position at which any ions within the flowing jet of hydrogen gas impact on the heat exchanger.

12. The method as claimed in claim 11 wherein the current through the electromagnetic coil is an alternating current.

13. The method as claimed in claim 12 wherein the alternating current is at a frequency less than 100 Hz.

14. The method as claimed in claim 9 wherein the hydrogen gas is provided by electrolysis of water.

15. The method as claimed in claim 14 wherein the electric power for electrolysis is provided by a solar panel.

* * * * *